No. 812,616. PATENTED FEB. 13, 1906.
H. THOENI.
WEED EXTERMINATOR.
APPLICATION FILED SEPT. 27, 1905.
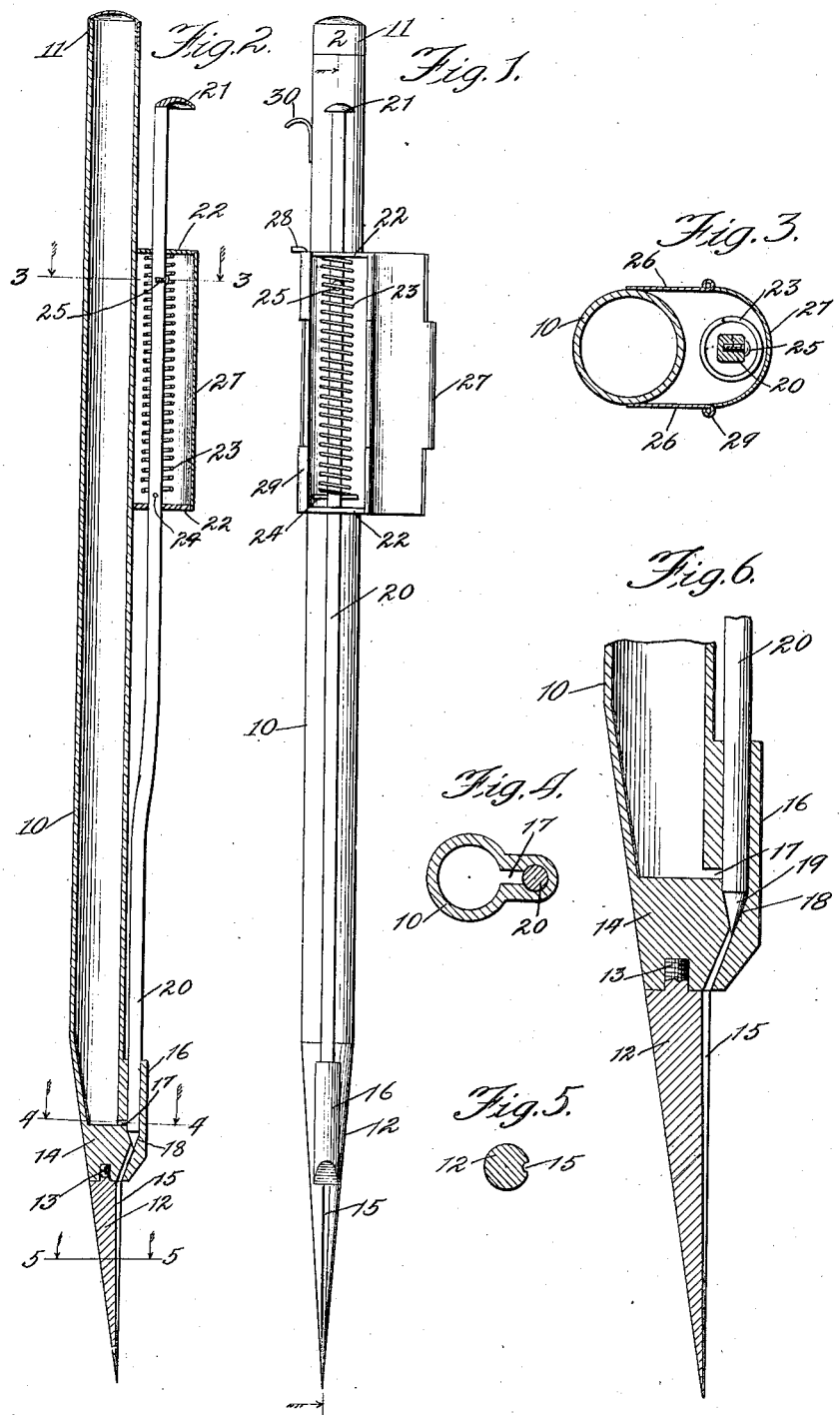
Inventor:
Herman Thoeni

UNITED STATES PATENT OFFICE.

HERMAN THOENI, OF SPOKANE, WASHINGTON, ASSIGNOR OF ONE-HALF TO ALBERT J. BURT, OF SPOKANE, WASHINGTON.

WEED-EXTERMINATOR.

No. 812,616.　　　　Specification of Letters Patent.　　　　Patented Feb. 13, 1906.

Application filed September 27, 1905. Serial No. 280,268.

*To all whom it may concern:*

Be it known that I, HERMAN THOENI, a citizen of the Republic of Switzerland, but having declared my intention of becoming a citizen of the United States, residing at Spokane, in the county of Spokane and State of Washington, have invented certain new and useful Improvements in Weed - Exterminators, of which the following is a specification, reference being had therein to the accompanying drawings.

This invention relates to an implement by means of which noxious plants or weeds, such as dandelions and the like, may be readily exterminated.

The object of the invention is to provide a device of this character which is compact in form, readily portable, and adapted to be operated by hand.

The invention consists of the combinations and arrangements of parts hereinafter particularly described and then pointed out in the appended claims.

In the accompanying drawings, Figure 1 is a view of the implement in elevation. Fig. 2 is a vertical sectional view on the line 2 2 of Fig. 1. Fig. 3 is a transverse sectional view on the line 3 3 of Fig. 2. Fig. 4 is a sectional view on the line 4 4 of Fig. 2. Fig. 5 is a sectional view through the penetrating-point of the implement, taken on the line 5 5 of Fig. 2; and Fig. 6 is a detail vertical section, on an enlarged scale, particularly illustrating the arrangement of the discharge-passage of the reservoir and the valve therefor.

Referring to the drawings, the numeral 10 indicates a suitable reservoir, which in the present instance is in the form of an elongated tube. This reservoir is designed to contain a liquid of such character as to kill or destroy the weeds when applied thereon or to the roots of the same. The upper open end of the tube is closed by a suitable cap 11. At its lower end the tube 10 is provided with a suitable penetrator 12, which in the present instance is tapered or conical in shape and brought to a point, as shown, and is provided at its upper end with a threaded stem 13, adapted to be screwed into the solid end 14 of the tube 10. The penetrator 12 has a suitable passage, which may be in the form of a longitudinal channel 15, the lower end of which terminates at the point of the penetrator 12.

The lower end of the tube 10 is provided with a lateral enlargement 16, through which passes a passage 17, communicating with the lower end of the tube 10 and terminating at the upper end of the passage 15 of the penetrator 12. The passage 17 is provided with a conical seat 18, to which is adapted a conical valve 19, as clearly shown in Fig. 6. The valve 19 is provided with a stem 20, which extends upwardly along the tube 10 and is provided at its upper end with a finger-piece 21. The upper end of the valve-stem 20 passes through suitable guides 22, which consist in the present instance of apertured plates fixed to the tube 10. An expansion-spring 23 is coiled about the stem 20 and located between the guides 22. One end of the spring reacts against the upper guide 22 and a shoulder 24, which in the present instance consists of a pin passing through the valve-stem. Upward movement of the valve-stem is limited by a stop 25, which takes the form of a screw entering the stem 20 and adapted to engage the upper guide 22.

A housing is provided for the spring 23 and consists in the present instance of side plates 26, fixed to the tube 10 between the guide-plates 22 and a door 27, one edge of which is hinged to one of the plates 26, while the other edge is adapted to be secured to the other plate 26 by means of a removable pin 28, which passes through suitable coinciding eyes 29 at the free edge of the door and the adjacent side plate 26. A stationary finger-rest 30, fixed to the tube 10 adjacent the pull 21, may also be provided for convenience in manipulating the implement.

When it is desired to use the implement, the cap 11 is removed and the reservoir filled with a suitable liquid. The implement is then grasped in the hand with the palm against the top or cover of the tube and the point of the penetrator pressed or inserted into the heart of the plant or weed at the root thereof with its point more or less deep, according to the toughness or hardiness of the plant. The finger-piece 30 and pull 21 are then engaged by the fingers and the pull elevated, thereby unseating the valve 19 and opening the passage 17. The liquid flows out from the reservoir through the discharge-passage into the passage 15 of the penetrator and flows downwardly into the heart or root of the plant. The valve 19 is maintained in its open position only long enough to permit the desired quantity of liquid to pass the same, and in practice it has been found that a few drops is sufficient to kill an ordinary weed. The pull 21 is then released to permit the valve to close. The valve should not be opened until the instrument has been inserted into the weed in order to prevent the liquid from coming into contact with other plants.

The implement is particularly useful for killing weeds on lawns and other places where hoeing cannot be done, although it is obvious that it may be used with equally advantageous results wherever weeds are to be found.

The penetrator 12 may be readily removed in the event that it becomes broken or needs sharpening. If the spring breaks or the passage 17 gets clogged up, to repair or clear the parts it is only necessary to remove the screw 25 and pin 24, when the valve-stem and valve may be drawn up past the guides 22. The spring 23 may then of course be removed from the housing.

Having described my invention, what I claim as new, and desire to secure by Letters Patent of the United States, is—

1. In a device of the class described, a tubular reservoir having a discharge-passage, a pointed penetrator at the lower end of the tube and having a longitudinal passage communicating with the discharge-passage and terminating at the point of the penetrator, and a valve controlling the discharge-passage.

2. In a device of the class described, a tubular reservoir having a discharge-passage, a conical-pointed penetrator at the lower end of the reservoir and having a longitudinal channel communicating with the discharge-passage and terminating at the point of the penetrator, a valve controlling the discharge-passage and provided with a finger-pull, and a spring for closing the valve.

3. In a device of the class described, a reservoir consisting of a tube adapted to contain a vegetation-destroying liquid and having a discharge-passage, a tapered penetrating-point secured to the lower end of the tube and having a longitudinal channel the upper end of which is in communication with the discharge-passage, a conical valve adapted to open and close the passage and having a stem provided at its upper end with a pull, a shoulder on the stem, a guide for the stem fixed to the tube, and a coil-spring reacting between the guide and the shoulder to maintain the valve in its closing position.

4. In a device of the class described, the combination with a tubular reservoir having a valve-controlled discharge-passage, of a pointed penetrator fixed to the tube and having a passage terminating at the penetrator-point for conducting the contents of the reservoir to the plant or weed into which the penetrator-point is inserted.

In testimony whereof I affix my signature in presence of two witnesses.

HERMAN THOENI.

Witnesses:
GEORGE W. ODELL,
DANIEL MICHEL.